United States Patent
Azizan et al.

(10) Patent No.: US 11,843,127 B2
(45) Date of Patent: Dec. 12, 2023

(54) BATTERY PROTECTION CIRCUIT AND METHOD

(71) Applicant: MOTOROLA SOLUTIONS, INC., Chicago, IL (US)

(72) Inventors: Muhamad Ridzuan Azizan, Baling (MY); Kow Chee Chong, Bayan Lepas (MY); Md Reduan Md Saad, Bukit Mertajam (MY); Chen Kok Yeoh, Bukit Mertajam (MY); Macwien Krishnamurthi, Shah Alam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 180 days.

(21) Appl. No.: 17/303,961

(22) Filed: Jun. 11, 2021

(65) Prior Publication Data

US 2022/0399614 A1    Dec. 15, 2022

(51) Int. Cl.
   *H01M 50/483*    (2021.01)
(52) U.S. Cl.
   CPC ...... *H01M 50/483* (2021.01); *H01M 2200/00* (2013.01); *H01M 2220/30* (2013.01)
(58) Field of Classification Search
   CPC ........... H01M 50/483; H01M 2200/00; H01M 2220/30
   See application file for complete search history.

(56) References Cited

U.S. PATENT DOCUMENTS

| | | | |
|---|---|---|---|
| 5,469,002 A | 11/1995 | Garrett | |
| 5,471,128 A * | 11/1995 | Patino | H02J 7/00047 320/128 |
| 7,145,313 B2 | 12/2006 | Geren et al. | |
| 10,461,527 B2 | 10/2019 | Arendell et al. | |
| 2013/0193763 A1* | 8/2013 | Zhao | E21F 17/06 307/65 |
| 2014/0117784 A1* | 5/2014 | Weissinger, Jr. | H01M 50/583 307/150 |
| 2021/0075206 A1 | 3/2021 | Azizan et al. | |
| 2021/0104886 A1* | 4/2021 | Lee | H02J 7/00308 |

* cited by examiner

*Primary Examiner* — Matthew T Martin
*Assistant Examiner* — Unique Jenevieve Luna
(74) *Attorney, Agent, or Firm* — Barbara R. Doutre; William Liu

(57) ABSTRACT

A battery, method and battery operated portable communication device are provided with protection from excessive current and thermal conditions. A plurality of protection circuits are coupled in series within a common charge/discharge path of the battery. The first protection circuit is configured to block current by opening a switch in response to a voltage drop across the switch and a current sense resistor in the common charge/discharge path. The second protection circuit provides redundancy under conditions where the first switch might fail, where the second switch will block current through the current sense resistor.

19 Claims, 4 Drawing Sheets

BATTERY PROTECTION CIRCUIT AND METHOD

BACKGROUND OF THE INVENTION

Portable communication devices may include circuits and/or electronics which draw current from a battery. Battery powered portable communication devices, such as public safety two-way radios, may be operated in hazardous locations that contain gases, vapors, dust, and/or fibers that create a risk of fire or explosion. Intrinsically safe batteries are required to safely operate a portable public safety radio within these highly hazardous locations. Past battery protection circuit approaches, such as passive circuit protection approaches, have tended to limit current source capability and thermal performance in order to meet global hazardous location (Hazloc) standards which in turn has made it challenging to provide feature rich radios offering long-term evolution (LTE), Bluetooth Low Energy (BLE), wireless fidelity (Wi-Fi), backlighting, large user interface displays and touch screens to name a few. Design challenges thus not only include the need to protect the device under the various global Hazloc standards but further include the mitigation of the aforementioned passive circuitry drawbacks so that feature rich radios can be enabled. Improvements in battery protection circuits that diminish the risk of explosion while addressing the factors of performance, recovery, and cost are therefore highly desirable.

Accordingly, there is a need for a battery providing additional Hazloc protection to existing traditional two-way radio battery protection circuitry.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
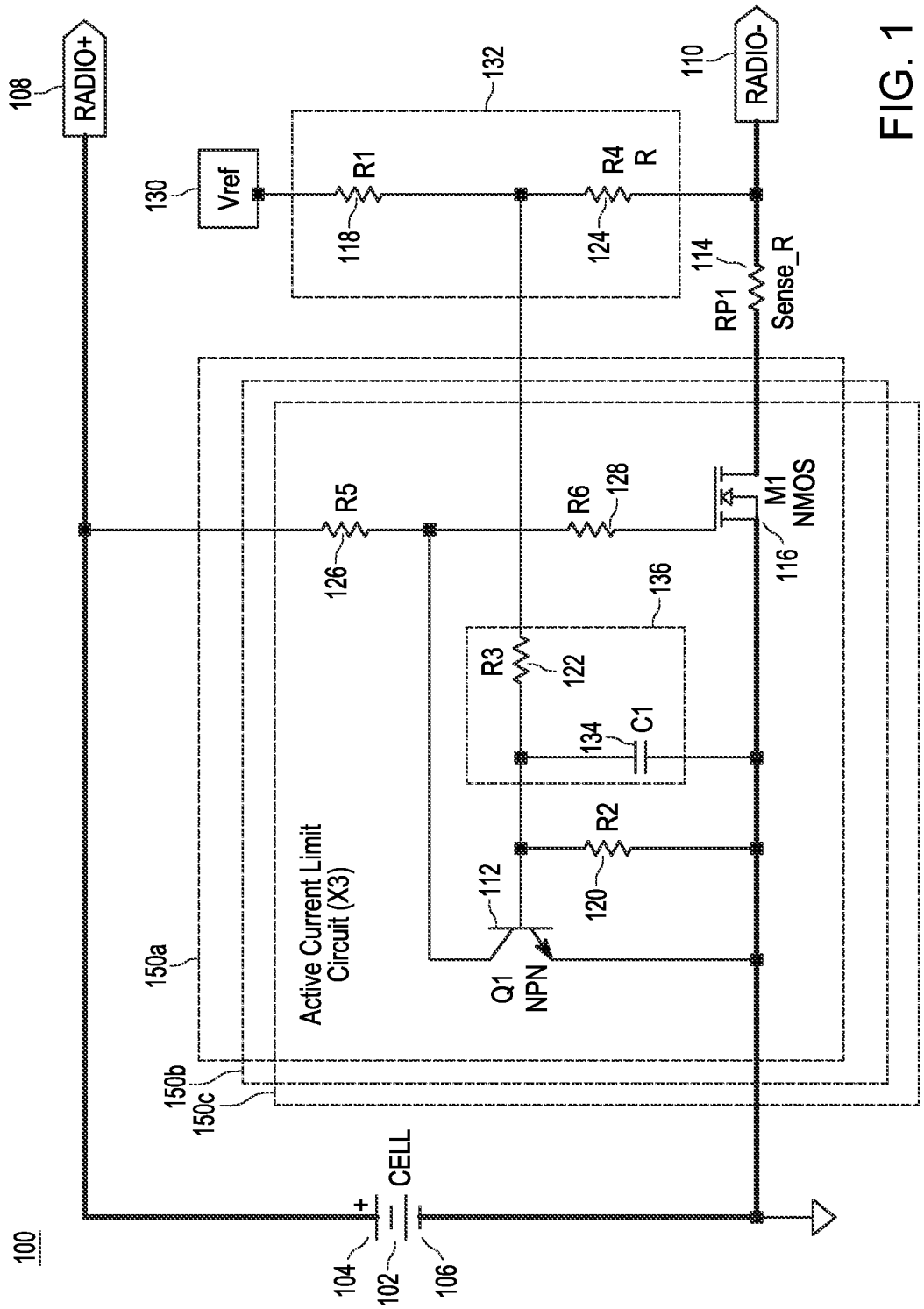
FIG. 1 is a schematic block diagram of a battery having a battery protection circuit formed in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein, a battery for a portable communication device, the battery comprises a battery protection circuit protecting against both excessive current and thermal operating conditions for intrinsically safe operation. The battery protection circuit of the battery is intended to provide additional protection to existing, known two-way radio battery protection circuitry (not shown or described). The battery protection circuit is formed of active circuitry which monitors a voltage drop in a common charge-and-discharge (charge/discharge) path of the battery, the voltage drop being indicative of current through a load presented by a communication device powered by the battery. For the purposes of this application, the common charge/discharge path is a single path connecting Radio+ to Radio− terminals of the battery through the battery's cell for charge and discharge activity. The active circuitry includes a bipolar transistor that monitors the voltage drop across a current sense resistor and a FET, the current sense resistor and FET being located in the common charge/discharge path of the battery. Under excessive current or thermal conditions, the voltage drop across the FET and sense resistor cause the bipolar transistor to be switched ON, and the switching ON of the bipolar transistor causes the FET to be switched OFF, blocking current to the battery cell. During recovery or during normal operation, the voltage drop across the FET and sense resistor cause the bipolar transistor to be switched OFF, and the switching OFF of the bipolar transistor causes the FET to remain switched ON, allowing current to be sensed and the voltage drop to be monitored. The active circuit provides for a fast recovery from voltage drops indicative of excessive current or thermal operating conditions, thereby avoiding the use of a passive, slow-reacting and non-recoverable fuse. The battery protection circuit is either duplicated or triplicated, and connected in series to the sense resistor in the common charge/discharge path to provide redundancy. If a first FET is fails (short circuits, high resistance or open circuit or a slow response anomaly), the second FET of the second battery protection circuit is in line with the sense resistor. If the second FET fails, the third FET is in line with the sense resistor, meeting Hazloc (hazardous location) redundancy requirements. The embodiments provided herein provide for a simplified active protection circuit providing high current sourcing capability in compliance with Underwriters Laboratories (UL) certification and "ATmosphere EXplosible" (ATEX) certification standards. The efficient and cost effective battery protection circuit further advantageously enables the ability to provide feature rich radios offering LTE, BLE, Wifi, backlighting, and large user interface displays and touch screens.

FIG. 1 is a schematic block diagram of a battery 100 formed in accordance with some embodiments. The battery 100 advantageously provides active circuit protection for energy products to meet excessive current protection requirements and thermal protection requirements, such as those of Hazloc (hazardous location) environments. Battery 100 comprises an internal battery cell 102, such as a lithium ion cell or other chemistry type cell, having a positive cell terminal 104 and a negative battery cell terminal 106 operatively coupled to positive and negative radio contact terminals 108, 110. When the battery 100 is attached to a host device, such as a two-way radio, the battery's external radio contact terminals 108, 110 provide power the host device. Many battery-powered devices operated in hazardous environments have a specification requirement that load current may not exceed a given threshold load current, and that load current may be higher or lower depending on the specification requirements. For example, Hazloc load current requirements have a lower load current threshold than normal load current requirements, due to the potential for sparking in hazardous environments. The embodiments provided herein are able to advantageously control the load current using either higher or lower trip currents.

In accordance with the embodiments, the battery 100 comprises a bipolar transistor Q1 112 operating as a switch, the bipolar transistor being operatively biased to an internal current sense resistor (RP1) 114 through a FET 116. The internal current sense resistor (RP1) 114 and FET 116. The current sense resistor (RP1)114 and FET 116 are located in a common charge/discharge path (shown in bold) of the battery 100 formed of a single path connecting Radio+ to Radio− terminals of the battery 100 to the battery's cell 102 for charge and discharge activity. In the embodiment of FIG. 1, the current sense resistor (RP1)114 and FET 116 are located between the negative radio contact terminal (Radio−) 110 and the negative battery cell terminal (cell−) 106 of the common charge/discharge path. The internal current sense resistor (RP1) 114 and FET 116 are used to detect spikes in current occurring at the negative radio contact terminal 110. The trip current is reflected into a trip voltage which controls the turning ON of the transistor Q1 112 biased for either higher or lower trip current conditions (higher Vbe trip voltage or a lower Vbe trip voltage). A spike in current will cause the transistor Q1 to turn ON, opening the FET 116, thereby preventing current from flowing from an external load to the battery cell 102.

In normal operation, the bipolar transistor Q1 112 is biased to be OFF and any small currents generated by a load across the radio contact terminals 108, 110 can flow from the negative radio contact terminal 110 through current sense resistor 114 and FET 116, wherein the FET 116 is turned ON and operates as a resistor to GND at the negative battery cell terminal 106. During a high peak current condition, the bipolar transistor Q1 112 is biased to turn ON in response to a voltage drop across the current sense resistor 114 and FET 116 indicative of a high current peak threshold being detected through current sense resistor 114. Turning the bipolar transistor Q1 112 ON causes the FET 116 to open thereby preventing the high peak current peak from passing to the negative battery cell terminal 106.

In accordance with the embodiments, triplicate active current limit protection circuits 150a, 150b, 150c are coupled in series between negative battery cell terminal 106 and the internal current sense resistor (RP1) 114, thus placing the protection circuits in the charge/discharge path of the battery 100, while monitoring and reacting sub-circuitries made up of Vref 130, divider network 132, and RC timer 136 are in parallel and independent. The additional active protection circuitry may be operated in addition to existing traditional two-way radio battery protection circuitry (not shown) to ensure current sourcing capability and thermal performance.

In accordance with the embodiments, each of the active current limit protection circuits 150a, 150b, 150c are configured identically and each comprising a bipolar transistor, such as the bipolar transistor (Q1) 112 (shown as an NPN transistor having a collector, a base and an emitter) wherein the emitter of Q1 is coupled to the negative battery cell terminal 106. Each of the active current limit protection circuits 150a, 150b, 150c further comprise a FET, such as FET 116, shown as an N-FET (metal-oxide-semicondoctor field-effect transistor) having drain, gate, source, wherein the drain is coupled to the negative battery cell terminal 106, and the gate is controlled by the bipolar transistor Q1 112.

Only one of the active current limit protection circuits 150a, 150b, 150c is activated in response to an excessive current condition, thereby saving current during normal operation mode. If the FET 116 of the first protection circuit 150a fails (e.g. short circuits, high resistance or open circuit or a slow response anomaly), then a FET of the second protection circuit 150b will be in line with current sense resistor 114. If the FET of the second protection circuit 150b fails (shorts), then a FET of the third protection circuit 150c will be in line with current sense resistor 114.

Protection circuit 150a is described, with the understanding that each protection circuit operates in the same manner. Biasing circuitry for transistor Q1 112 may comprise a plurality of components, such as resistors R1 118, R2 120, R3 122, R4 124, R5 126, and R6 128. The plurality of resistors may be configured as resistive divider networks (R1, R4) and (R2, R3), isolation resistors (R6), and may be further configured for resistor-capacitor (RC) timing (R3, C1) or (R4, C1) Resistor R1 118 is coupled to a voltage reference (Vref) 130 and forms a divider network 132 with resistor R4 124, coupled to the negative radio contact terminal 110. The divider network 132 may be used, for example, for low trip biasing of the transistor Q1 112, as described later.

Resistor (R2) 120 is coupled across the base-emitter junction of Q1 112, where the emitter is tied to the negative battery cell terminal 106. Resistor R3 122 is tied between the base of Q1 112 at the junction of divider network 132. Resistor (R5) 126 provides a pull up resistor to the collector of Q1 112, coupling to the positive battery cell terminal 104 and to the positive radio contact terminal (radio+) 108. Resistor R6 128 provides an isolation resistor tied to the junction of the collector Q1 112 and pull up resistor R5 126 to control the gate of the FET 116. A capacitor C1 134 is coupled between the base and emitter of Q1 112. An RC timer 136 may be formed of resistor R3 122 and a capacitor C1 134 for high trip timing purposes. An RC timer may be formed of R4 124 and C1 134 for low trip timing purposes. Additional or fewer components may be used depending on whether a lower trip current application or a higher trip current application is desired—both approaches will be described. Components which are used in one approach and not the other will be noted and can be removed/disabled or replaced as will be indicated.

Each of the active current limit protection circuits 150a, 150b, 150c comprises a pull-up resistor, such as (R5) 126, coupled between the positive cell terminal 104 and the collector of Q1 112. Each of the active current limit protection circuits 150a, 150b, 150c further comprises the isolation resistor (R6) 122 and the FET (M1) 116 (having drain, gate, source), wherein the isolation resistor (R6) is coupled between the collector of Q1 120 and the gate of N-FET (M1) 124. The drain of N-FET (M1) 124 is coupled to the current sense resistor (RP1) 116, and the source of N-FET (M1) 124 is coupled to the negative battery cell terminal 106.

The internal current sense resistor (RP1) 114 is a single infallible current sense resistor and the voltage reference (Vref) 130 is a single low-dropout (LDO) voltage reference. The single LDO voltage reference (Verf) 130 and single infallible current sense resistor (RP1) 116 serve three levels of protection to active current limit protection circuits 150a, 150b, 150c. The three levels of protection provide for a countable fault (CF). For semiconductor type protection, Safety Bodies require a set of countable faults per their respective standard. For the UL standard, for example, for two (2) countable faults, there are three (3) redundant protection circuits in order to have the overall battery circuit fail safe/operate per the standard. The RC timing circuit (R3, C1) 136 duration is tunable from very fast for spark protection or to slow for thermal protection based on RC filter of R3 (IF) and C1 countable fault, (CF). To accommodate both spark protection and thermal protection a lower trip threshold and slower time control is used.

For a higher trip current embodiment, the voltage divider used to bias Q1 is formed of R2 120 and R3 122. For a higher trip current embodiment, an RC timing circuit (R3, C1) 120 may be used, where C1 is coupled across the base and emitter of Q1 112 and R3 122 is coupled between the bases of Q1 112 directly to the negative radio contact terminal 110. For the higher current trip configuration Vref, R1, and R4 are not needed. For example, a zero-ohm short can be put in place of R4, while R1 and Vref can be eliminated.

For a lower current trip configuration, the voltage reference (Vref) 130, resistor R1 118, and resistor R4 124 are used and R3 122 may be eliminated. For example, a zero-ohm short can be used in place of R3, thereby providing a divider network formed of Vref, R1, and R4 to bias the transistor Q1 112. The voltage reference (Vref) 130 is a single low-dropout regulator (LDO regulator). The reference voltage (Vref) 130 with limiting resistor R1(IF) and R4 (CF) functions to pre-bias transistor Q1 120 to reduce the trip current threshold, if needed by design. In accordance with the embodiments, the single level voltage reference is sufficient to provide a pre-biasing voltage to triple transistor circuitry (Q1 in each of 150a, 1150b, 150c) and meet the Hazloc requirement.

In accordance with the embodiments, the Q1 bipolar transistor 112 operates as a switch in saturation mode. The collector of the Q1 bipolar transistor 112 conducts when the transistor base is biased for more than a base-emitter saturation voltage. Transistor Q1 112 turning ON causes the FET 116 to turn OFF (open) and block current to the battery cell 102. The R6 (IF) isolation resistor 128 limits current from a host radio device to the battery cell 102 under conditions in which the N-FET (M1) 124 is faulted and shorts the drain pin to the source pin.

In a normal operation mode, a load presented by a host device across radio contacts (radio+ and radio−) draws current from the battery cell 102. During normal operation mode transistor Q1 120 is OFF and the N-FET (M1) 124 is switched ON.

In a hazardous mode of operation, a short appears across the contacts (radio+ and radio —) creating a high current through the current sense resistor (RPI) 114 and the N-FET (M1) 124, thereby generating a large voltage drop across current sense resistor (RP1) 116. This voltage drop is sufficient to bias transistor Q1 ON through resistor R1 and resistor R3 going to the base of Q1 120. Turning on Q1 120 shorts the collector and emitter thereby presenting the cell voltage through R6 to the gate of FET 116 which pulls the gate to the source which is the GND of the cell. The source and gate are thus shorted to GND turning N-FET (M1) 124 OFF, which leaves the source/drain open thereby cutting off current from the current sense resistor (RPI) 114. Only under the short circuit conditions is negative radio contact (radio−) opened via the short of the source/gate of FET 116 and open of the source/drain. The transistor Q1 120 remains ON and the N-FET remains OFF until the spark across the load is gone.

Under a recovery mode of operation, the spark is removed and the negative radio contact (radio−) no longer has a voltage present, the voltage drop across the base emitter (Vbe) of Q1 120 will be removed thereby turning Q1 OFF and turning N-FET (M1) 124 back ON.

The FET 116 provides three modes of operation: short, open, and resistor operations. The resistor operation of the FET 116 is considered a fault condition which for Hazloc is considered a countable fault (CF) type component. The resistor fault condition may occur when small currents flow between the positive and negative radio terminals (radio+, radio−). These small currents can result in the generation of heat which, if exceeding a heat threshold, could potentially cause ignition within the battery 100. During a fault condition across the terminals (radio+, radio−), the FET 116 becomes resistive and develops a voltage drop across the FET which turns ON transistor Q1 120. The fault condition may be, as described previously, the FET shorting, or one of the redundant FETs being partially or fully damaged presenting abnormal resistances due to the loss of its functionality at the piece part level, then the redundant and functioning FETs provide the switching OFF of the current path by way of the total voltage drop sensed across the cell− to Radio−. Turning ON transistor Q1 112 then turns FET 116 OFF.

The R6(IF) isolation resistor 128 limits current from a host radio device to the battery cell 102 under conditions in which the N-FET (M1) 124 is faulted and shorts the drain pin to the source pin.

If a lower trip voltage for a lower trip current is desired, a resistive divider network formed of Vref, R1, and R4 can be used to pre-bias Q1 120 (e.g. lower trip voltage of 0.3 volts). In this case R2 and R3 are not required. Now R4 is directly connected to Q1 base and effectively shares the same voltage as Vbe of Q1. In other words, with unintended low current passage, the voltage drop is too low to activate Q1; hence a large voltage drop manipulative method is applied.

The bipolar transistor 112 (Vb) remains OFF under normal operating conditions where:

$$Vbe\ OFF = < Vbe(\text{saturation})$$

$$VR4 + Vds(M1) + VRP1) = < Vbe(\text{saturation});\ \text{where}$$

$$VR4 = Vref * R4/(R1+R4))$$

To turn ON the bipolar transistor 112, under short circuit conditions occurring at the radio contact terminals 108, 110:

$$Vbe\ ON > Vbe(\text{saturation})$$

$$VR4 + Vds(M1) + VRP1 > Vbe(\text{saturation});$$

$$\text{where}\ VR4 = Vref * R4/(R1+R4))$$

wherein Vsc (short circuit voltage at battery contacts)=Vds(M1)+VRP1=Isc*[RP1+M1's RdsON], and
where, Isc is the short circuit current; and
RdsON is the FET's 116 turn ON resistance.
If a higher detection trip voltage for higher trip current is desired (e.g. 2 times Vbe(saturation) or higher), then Vref, R4 and R1 may be omitted and the R3 directly connects to the radio− contact. A resistive divider network forms of R2 and R3,R4 which can be used to provide for the higher trip voltage (where R3 connects directly to the negative contact terminal (radio−). Now, R2 and R3 are effectively in parallel to MOSFET (M1) 124 and sense resistor (RP1) 116, which is a low resistive path. The bipolar transistor 112 remains OFF under normal operating conditions where:
Vbe OFF=<Vbe(saturation)
VR2=<Vbe (saturation)
where VR2=R2/[R2+R3]*(Vds(M1)+V(RP1)
To turn ON the bipolar transistor 112, under short circuit conditions:

Vbe ON>Vbe(saturation)

VR2>Vbe(saturation) where VR2=R2/[R2+R3]*(Vds(M1)+V(RP1)

wherein Vsc (short circuit voltage at battery contacts)=Vsc=V(RP1)+Vds(M1)=Isc*[RP1+M1's RdsON],
Isc is the short circuit current, and
RdsON is the MOSFET's turn ON resistance.

Hence, the Vbe (saturation) advantageously operates as reference voltage to determine the current trip threshold for either Isc or normal current. The RC timer is used to advantageously slow down the detection capability of the protection circuit(s) so the transient peak current are not missed and excessive current caused by thermal conditions are captured. In other words, a long trip delay time is provided using an RC timer with high value to enable the circuit to detect the voltage drop under fast transient conditions and longer thermal conditions. For example, the timer may be set to accommodate the time associated with building up semiconductor resistance as well as to avoid an inrush current into the radio host's bulk (total effective capacitance), thereby advantageously avoiding a host lock out situation on initial battery attachment to the host radio and power up. The active current limit protection circuits include the RC timing circuit for timing control that slows down the excessive current detection capability to detect excessive current under transient conditions and thermal conditions.

In the scenario where M1 116 is thermally damaged (resistive ohms), then M1 116 no longer provides the execution of tuning ON or OFF and is no longer functional. Instead, M1 116 merely adds to the cumulative voltage drops of its own coupled with the "good" FETs of the other two (2) redundant circuits plus other resistance on that common charge/discharge path, thereby providing for overall thermal protection Some intrinsic safety standards require two levels of redundancy while others, such as Hazloc, require triple redundancy. Triple redundancy permits two circuit faults and one backup, while double redundancy permits one fault and one backup.

Figure 2:
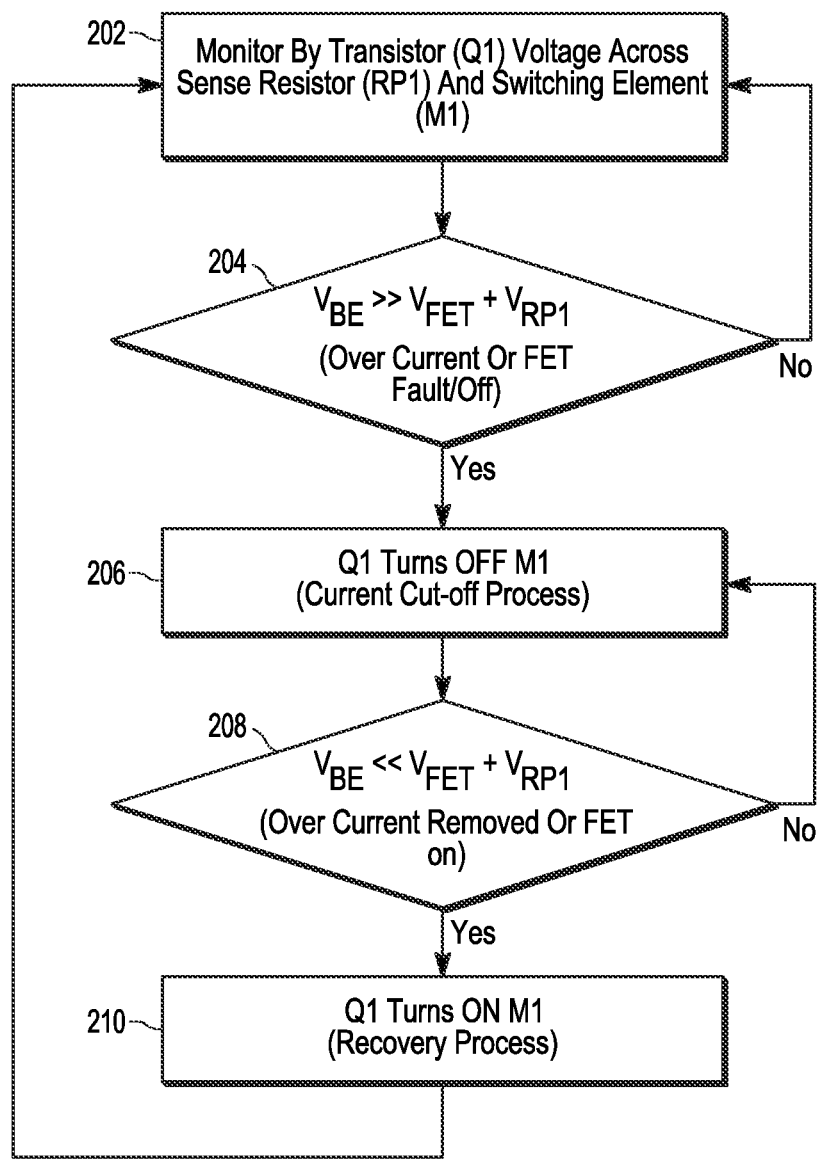
FIG. 2 is a flowchart of a method for operating the battery protection circuit of FIG. 1 in accordance with embodiments.

FIG. 2 is a method 200 for activating the battery protection circuit in accordance with embodiments. The method comprises monitoring, using a bipolar transistor, a voltage drop across a series coupled sense resistor and FET located in a common charge/discharge path of the battery, the voltage drop across the series coupled sense resistor and FET being indicative of load current at the battery. For example at 202, and referring to FIG. 1, transistor Q1 112 monitors the voltage drop across currents sense resistor (RP1) 114 and FET 116.

The method continues by turning ON the bipolar transistor and turning OFF the FET switch during an over current condition of the load current; and turning OFF the bipolar transistor and turning ON the FET switch during recovery from the over current condition of the load current. For example at 204, if the base emitter voltage ($V_{BE}$) of the bipolar transistor 112 is not greater than the voltage sum across the combined FET switch 116 and the current sense resistor 114 (VFET+VRP1) then the method returns to continue monitoring at 202, as this is deemed to be normal operation During normal operation Q1 112 if OFF which keeps FET 116 turned ON. If at 204, the base emitter voltage ($V_{BE}$) of the bipolar transistor 112 is greater than the voltage sum across the combined currents sense resistor (RP1) 114 and FET 116 (VBE>>VFET+VRP1), then method continues to 206 where transistor Q1 120 turns ON which turns OFF the FET switch 116, which blocks current to the battery cell.

Once the excessive current condition has been removed, Q1 112 turns OFF which in turns the FET 116 back ON.

The method 200 may be operated over the plurality of series coupled active current limit protection circuits to provide redundancy. Controlled timing of the active current limit protection is provided by using an RC timer that slows down the excessive current detection capability to detect excessive current under both transient conditions and thermal conditions.

Figure 3:
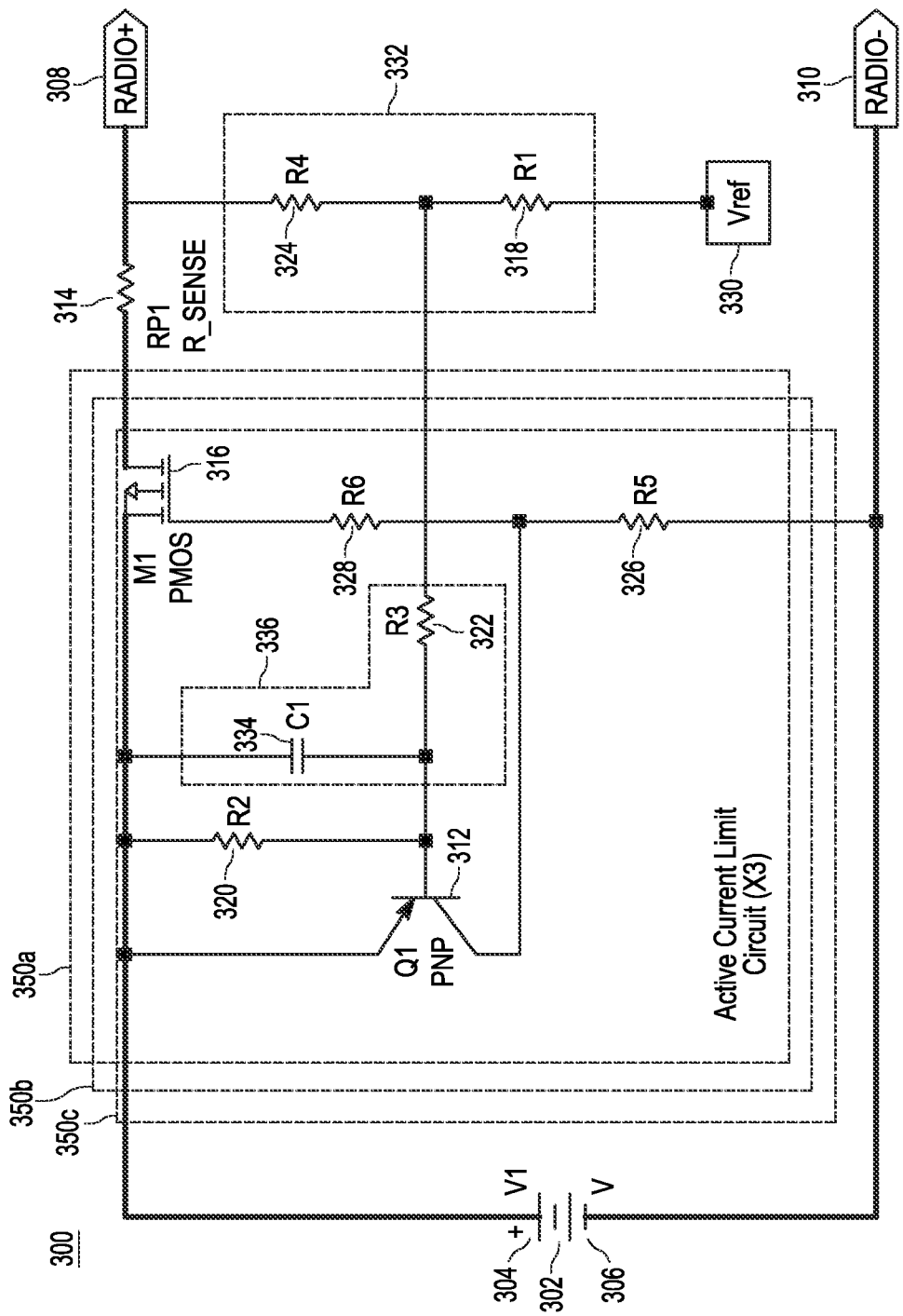
FIG. 3 is an alternative schematic block diagram of a battery protection circuit formed in accordance with some embodiments.

FIG. 3 shows schematic block diagram showing an alternative implementation for the battery protection circuit of FIG. 1, in accordance with some embodiments. Here again, a plurality of protection circuits 350a, 350b, 350c are coupled in series to a current sense resistor 314, the current sense resistor in this case is in a positive, high side (+ve path) of the charge/discharge path of the battery. In this embodiment, the current sense resistor (RP1) 314 and a P-FET 316 are located in a common charge/discharge path (shown in bold) of the battery 300 formed of a single path connecting Radio+ to Radio− terminals of the battery 300 through the battery's cell 302 for charge and discharge activity. In the embodiment of FIG. 3, the current sense resistor (RP1) 314 and P-FET 316 are located between the positive radio terminal (Radio+) 308 and the positive side (cell+) 304 of battery cell 302 in the common charge/discharge path. Each of the plurality of protection circuits 350a, 350b, 350c comprises a PNP bipolar transistor Q1 312 and the P-FET 316, while monitoring and reacting sub-circuitries Vref 330, divider network 332, and RC timer 336 are in parallel and independent. Biasing circuitry for transistor Q1 312 may comprise a plurality of components, such as resistors R1 318, R2 320, R3 322, R4 324, R5 326, and R6 328. The additional active protection circuitry may be operated in addition to existing traditional two-way radio battery protection circuitry (not shown) to ensure current sourcing capability and thermal performance.

During normal mode operation, the PNP transistor is OFF and the base emitter voltage Vbe of Q1 312 turns on the P-FET 316 (the Q1_PNP turns on when Vbe<−Vbe (saturation)) so that current from the load is sensed through the current sense resistor 314. When an excessive current condition occurs across the terminal radio+, radio−, the PNP base emitter voltage turns ON (VbeON) which controls the turning off the P-FET. Turning OFF the P-FET prevents the high current transients of varying durations to be suppressed and curbs a spark situation at the radio contacts as well as thermal events caused by soft short currents. from coming through battery circuitry, thereby protecting the circuitry and cell. Again, a triple redundancy is provided to meet Hazloc requirements via triple series connected protection circuits. Other standards may only require two levels of protection.

Figure 4:
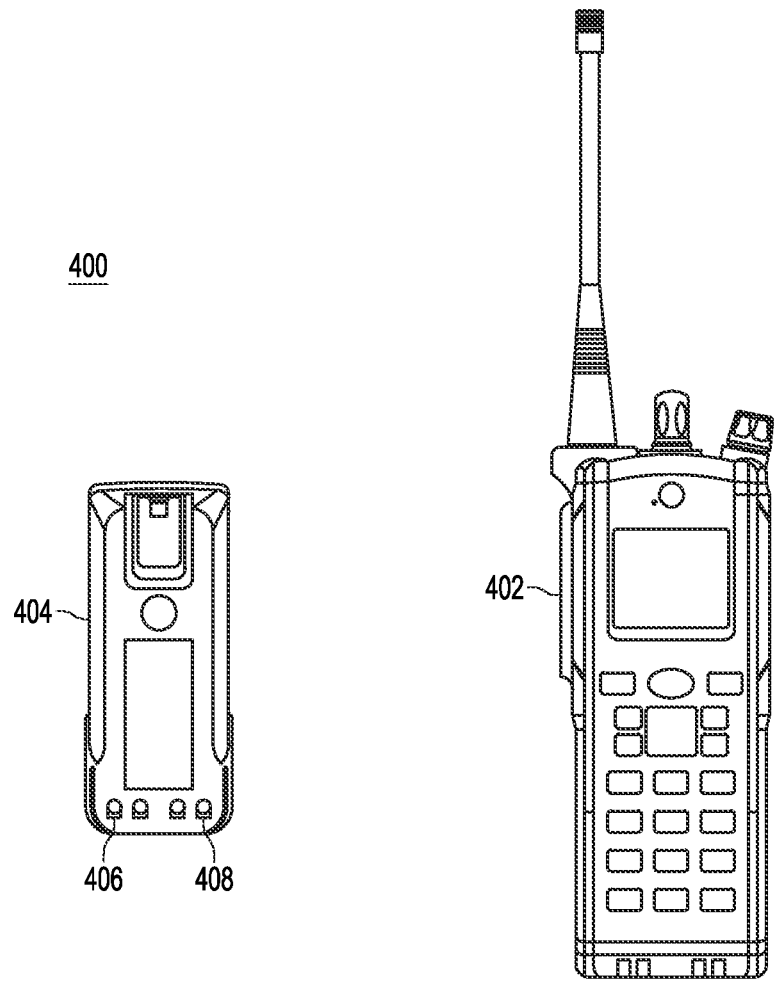
FIG. 4 is a portable communication system in accordance with some embodiments.

FIG. 4 is a portable communication system 400 in accordance with some embodiments. The portable communication system 400 comprises a portable communication device 402, such as a portable public safety radio, powered by a battery 404, the portable communication device including a load with a varying current. In accordance with the embodiments, the battery 404 comprises an internal current sense resistor coupled between a radio contact terminal (406 or 408) and a first of a plurality of series coupled internal identical active protection circuits, each active protection circuit including a FET. As previously described, the FET is configured to operate as a switch to block current in response to a voltage drop across the switch and the current sense resistor. A second active protection circuit providing redundancy under conditions in which the first switch fails, allows a second switch to block current through the current sense resistor. Additional active protection circuits can be coupled in series as previously described.

The plurality of active protection circuits of battery 404 beneficially allow portable communication device 402 to operate as a hazardous location (Hazloc) radio. The portable communication system 400 may be used for example in mines, smoky areas and/or other hazardous locations where sparks and the like may cause explosions and the like, as well as operate within extreme temperature conditions. The additional current and thermal protections enable the ability to provide feature rich radio products, such as radios offering long-term evolution (LTE), Bluetooth Low Energy (BLE), wireless fidelity (Wi-Fi), backlighting, large user interface displays and touch screens to name a few. The active current limit protection beneficially operates without the use of an op-amp, voltage comparator and fuse. The portable communication system 400 may also be used in non-hazardous environments.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A battery for a portable communication device, the battery comprising:
a cell having positive and negative cell terminals;
positive and negative radio contact terminals operatively coupled to the positive and negative cell terminals to provide a common charge/discharge path to the battery;
a plurality of active current limit protection circuits coupled in series in the common charge/discharge path;
a pre-biasing circuit coupled to the plurality of series coupled active current limit protection circuits;
wherein the plurality of active current limit protection circuits each comprise:
a bipolar transistor switch;
biasing circuitry; and
a field effect transistor (FET) switch;
a current sense resistor coupled in series with the plurality of active current limit protection circuits, the current sense resistor and a FET from the plurality of active current limit protection circuits positioned in the common charge/discharge path, the current sense resistor and the FET providing a voltage drop across the current sense resistor and the FET, the voltage drop being indicative of a load current present on the battery; and
wherein the plurality of active current limit protection circuits comprises at least first and second active current limit protection circuits, the first current limit protection circuit being configured to:
turn ON a first bipolar transistor which turns OFF a first FET switch of the first active current limit protection circuit during an excessive current condition of the load current, thereby blocking current through the common charge/discharge path; and
turn OFF the first bipolar transistor which turns ON the first FET switch during recovery from the over current condition of the load current;
and
under conditions in which the first FET is damaged and does not turn OFF in response to the excessive current condition, the second current limit protection circuit being configured to:
turn ON a second bipolar transistor which turns OFF a second FET switch of the second active current limit protection circuit during the excessive current condition of the load current, thereby blocking current through the common charge/discharge path; and
turn OFF the second bipolar transistor which turns ON the second FET switch during recovery from the over current condition of the load current.

2. The battery of claim 1, wherein the plurality of active current limit protection circuits are coupled in series within the common charge/discharge path of the battery and each of the plurality of active current limit protection circuits comprises:
an NPN transistor,
biasing circuitry; and
an N-FET.

3. The battery of claim 1, wherein the plurality of active current limit protection circuits are coupled in series within the common charge/discharge path of the battery and each of the plurality of active current limit protection circuits comprises:
a PNP transistor,
biasing circuitry; and
a P-FET.

4. The battery of claim 1, wherein the active current limit protection circuits include an RC timing circuit for timing control that slows down the excessive current detection to detect excessive current under transient conditions and thermal conditions.

5. The battery of claim 1, further comprising:
a single level voltage reference provides pre-biasing voltage to the pre-biasing circuit.

6. The battery of claim 1, wherein the current sense resistor is a single infallible (IF) current sense resistor component.

7. The battery of claim 1, wherein the pre-biasing circuit and biasing components are countable fault (CF) type components.

8. The battery of claim 1, wherein the active current limit protection operates without use of an op-amp, voltage comparator and fuse.

9. A portable communication system, comprising:
a portable communication device powered by a battery, the portable communication device including a load with a varying current; and
the battery comprising:
a current sense resistor coupled to a radio contact terminal in a common charge/discharge path of the battery;
a plurality of active protection circuits coupled in series with the current sense resistor, the plurality of active protection circuits comprising:
a first active current limit protection circuit comprising a first FET switch configured to block current by opening the switch in response to a voltage drop across the switch and the current sense resistor, the first active current limit protection circuit comprising:
a first bipolar transistor for controlling turning ON and OFF the FET switch;
biasing circuitry for controlling turning ON and OFF the first bipolar transistor;
the current sense resistor and the first FET positioned in the common charge/discharge path, the current sense resistor and the FET providing a voltage drop across the current sense resistor and the first FET, the voltage drop indicative of a load current present on the battery;
the first active current limit protection circuit being configured to:
turn ON the first bipolar transistor to turn OFF the first FET switch during an excessive current condition of the load current, thereby blocking current; and
turn OFF the first bipolar transistor to turn ON the first FET switch during recovery from the over current condition of the load current; and
a second active current limit protection circuit providing redundancy under conditions in which the first FET switch fails, and a second FET switch blocks current through the current sense resistor.

10. The portable communication system of claim 9, wherein each of the plurality of active protection circuits are identical.

11. The portable communication system of claim 9, wherein the second active current limit protection circuit comprises:
a second bipolar transistor for controlling turning ON and OFF the second FET switch;
biasing circuitry for controlling turning ON and OFF the second bipolar transistor;
under conditions in which the first FET is damaged and does not turn OFF in response to the excessive current condition, the second active current limit protection circuit being configured to:

turn ON the second bipolar transistor to turn OFF the second FET switch during the excessive current condition of the load current, thereby blocking current through the common charge/discharge path; and turn OFF the second bipolar transistor to turn ON the second FET switch during recovery from the over current condition of the load current.

12. The portable communication system of claim 9 wherein the portable communication device and battery are operable under both Hazloc and non-Hazloc environments.

13. The portable communication system of claim 12 wherein the portable communication device is a portable public safety radio.

14. The battery of claim 1, wherein the current sense resistor is in line with the FET of each of the plurality of active current limit protection circuits.

15. The battery of claim 1, wherein only one of the plurality of active current limit protection circuits is activated in response to an excessive current condition.

16. The portable communication system of claim 9, wherein the current sense resistor is in line with the FET of each of the plurality of active current limit protection circuits.

17. The portable communication system of claim 9, wherein only one of the plurality of active current limit protection circuits is activated in response to an excessive current condition.

18. The battery of claim 5, wherein the single level voltage reference provides pre-biasing voltage to the pre-biasing circuit for adjusting trip current threshold to meet a predetermined hazardous environmental requirements.

19. The portable communication system of claim 9 comprising:

a single level voltage reference provides pre-biasing voltage to the pre-biasing circuit for adjusting trip current threshold to meet a predetermined hazardous environmental requirements.

* * * * *